Jan. 16, 1940.   C. A. TEA   2,187,505
METHOD OF MAKING A WEATHER STRIP
Filed Sept. 8, 1938

INVENTOR
CLARK A. TEA
BY Harness, Dind Patee & Harris
ATTORNEYS.

Patented Jan. 16, 1940

2,187,505

UNITED STATES PATENT OFFICE 2,187,505

METHOD OF MAKING A WEATHER STRIP

Clark A. Tea, Detroit, Mich., assignor to Chrysler Corporation, Highland Park, Mich., a corporation of Delaware Application September 8, 1938, Serial No. 228,898

8 Claims. (Cl. 154—2)

This invention relates to a weather strip especially adapted for use on motor vehicle bodies to seal the opening around the doors or windows and more particularly to the method of making the same.

It is an object of this invention to provide a weather strip which is cheaper than conventional weather strips because of the method of making it.

Another object of this invention is to provide a weather strip which is strong, inherently resilient, and inexpensive to make.

A further object of the invention is to provide a weather strip which is free to bend laterally in applying the same to a curved opening.

A further object of the invention is to provide a weaher strip which has sufficient resiliency to cause it to tightly engage the door or window for sealing purposes and yet adapted to take a permanent set when bent beyond its elastic limit, so that in applying the weather strip to an opening it may be bent beyond its elasic limit to conform to any irregularities around the opening and after being bent to that position possesses sufficient resiliency to flex within given limits.

More specifically, the invention consists of taking a pre-formed wire spring and placing it between preglued backing members such as paper, or any other suitable material, and then flattening the coils of the wire by passing it between rollers, so that it lies flat and the backing members are glued together. Then applying it to a central portion of a cushioning part so that the attaching portion of the weather strip extends into the cushioning part and laterally therebeyond.

Further objects and advantages of my invention will be more apparent from the following detailed description of the embodiments of my invention, reference being had to the accompanying drawing in which.

Figure 1:
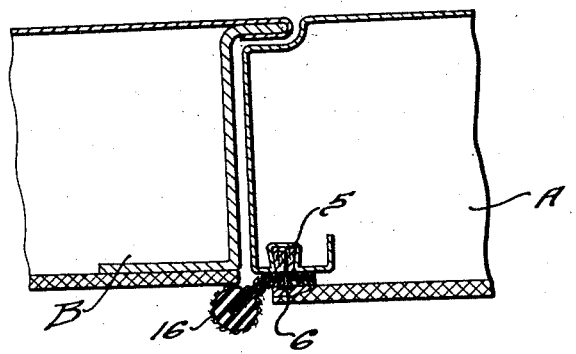
Fig. 1 is a sectional view, parts being broken away and in section, of one application of the device as applied to an automobile door opening.

Referring to the drawing a portion of a vehicle body is shown at A in connection with a door B. The body A is provided with a tacking insert 5 to which the weather strip is secured such as by tacks 6.

Figure 3:
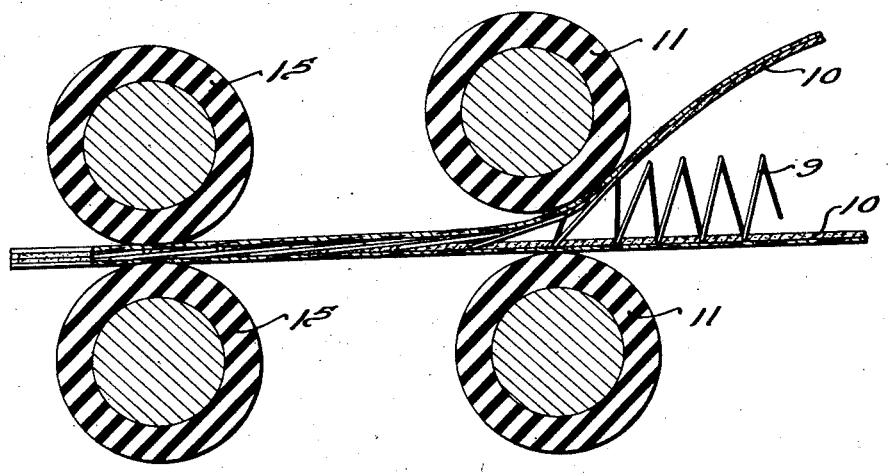
Fig. 3 is a view showing the method of rolling the spring flat so that it can be used as an attaching portion when covered by backing or some other suitable material, the rollers being shown in section.

Referring to Fig. 3, an ordinary coil spring 9 is placed between backing material 10, such as pre-glued paper, and is rolled flat by two rubber rimed rollers 11. After passing through the rollers 11 which flatten the wire spring 9 and glue the paper 10 it passes through another set of rubber rimed rollers 15 which are closer together than the first named rollers 11 and which press the paper together and glue it more firmly than the first named rollers 11. This method of making an attaching portion is obviously very much cheaper than conventional methods of making them because of the relatively little work that is necessary to make the attaching portion, and because of the little machinery used.

Figure 2:
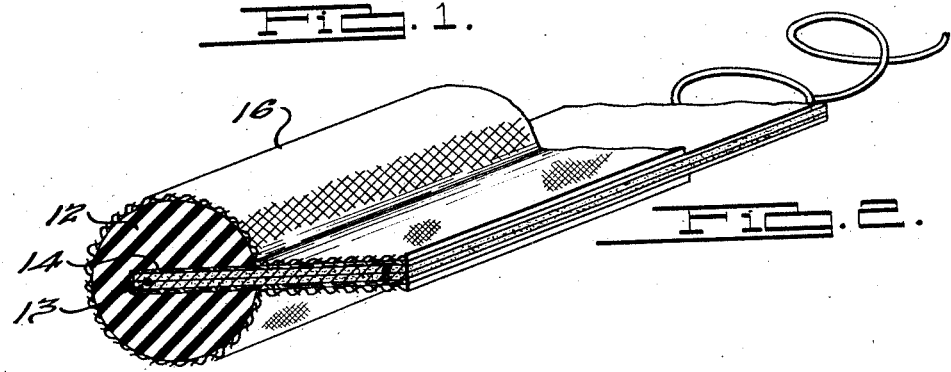
Fig. 2 is a perspective view of the weather strip alone, parts thereof being broken away and in section.

Referring now to Fig. 2 the weather strip comprises a resilient cylindrical member 12, an attaching member 13 which is inserted through a longitudinal slit 14 in the cylindrical member 12. If desired the resilient cylindrical member 12 may be moulded around the attaching member 13 obtaining the same results. The entire weather strip is covered by a fabric 16.

In order to give the parts enough rigidity and at the same time provide sufficient flexibility it is important to select a wire having a deflecion characteristic which, when bent within limits, is elastic but when bent beyond its limits takes a base set and is elastic from that bent position. This is extremely important when the weather strip is applied to an irregular surface. For example the strip may be manually bent beyond its elastic limit to fit an irregular surface but when so bent it is elastic from that bent position. I have found that a wire suitable for this purpose should have an elastic limit between 250,000 lbs. per square inch and 350,000 lbs. per square inch and may be formed from what is commonly termed music wire having a diameter of approximately one-sixty-fourth of an inch.

In order to keep the coils of the spring the same distance apart it is necessary to apply tension. The more tension that is applied the farther apart the coils are pulled. Therefore it is possible through this tension to regulate the number of coils per inch, and makes it possible for the spring to be rolled evenly.

What I claim is:

1. The method of manufacturing an attaching portion for a weather strip, which comprises placing a helically coiled wire spring between backing members, flattening said spring and securing the backing members together.

2. The method of manufacturing an attaching portion for a weather strip, which comprises placing a helically coiled wire spring between pre-glued backing members, flattening said spring and by so flattening the spring gluing the backing members together.

3. The method of manufacturing an attaching portion for a weather strip, which comprises placing a helically coiled wire spring between backing members, passing said wire spring while between said backing members between rollers which flatten out the spring, and securing the backing members together.

4. The method of manufacturing an attaching portion for a weather strip, which comprises placing a helically coiled wire spring between pre-glued backing members, passing said wire spring while between said pre-glued backing members between rollers which flatten out said spring and glue the backing members together.

5. The method of manufacturing an attaching portion for a weather strip, which comprises placing a helically coiled wire spring between pre-glued backing members, passing said wire spring which is between said pre-glued backing members between first, one set of rollers which flattens out said spring and partially glues said backing members together and second, a second set of rollers which are set much closer together and which press said backing members closer together so as to assure good adhesion.

6. The method of manufacturing a weather strip, having an attaching portion and a resilient cylindrical member, which comprises placing a helically coiled wire spring between backing members, flattening said spring and securing the backing together, securing said attaching portion to said cylindrical member, and covering the entire weather strip with a suitable covering.

7. The method of manufacturing a weather strip, having an attaching portion and a resilient cylindrical member, which comprises placing a helically coiled wire spring between backing members, passing said wire spring which is between said backing between rollers which flatten out the spring and secure the backing members together, securing said attaching portion to said cylindrical member, and covering the entire weather strip with a suitable covering.

8. The method of manufacturing a weather strip, having an attaching portion and a resilient cylindrical member, which comprises placing a helically coiled wire spring between pre-glued backing members, passing said wire spring which is between said pre-glued backing members between first, one set of rollers which flattens out said spring and glues said backing members together and second, a second set of rollers which are set much closer together and which press said backing members closer together so as to assure good adhesion, and securing said attaching portion within the body of said cylindrical member.

CLARK A. TEA.